No. 638,243. Patented Dec. 5, 1899.
W. HINDLEY & J. W. HARDING.
KNOTTER.
(Application filed Nov. 12, 1897.)
(No Model.) 6 Sheets—Sheet 1.

INVENTORS:
William Hindley and
Joseph W. Harding
BY
W. B. Hutchinson.
ATTORNEY.

No. 638,243. Patented Dec. 5, 1899.
W. HINDLEY & J. W. HARDING.
KNOTTER.
(Application filed Nov. 12, 1897.)

(No Model.) 6 Sheets—Sheet 3.

WITNESSES
INVENTORS:
William Hindley and
Joseph W. Harding
By W. P. Hutchinson
ATTORNEY No. 638,243. Patented Dec. 5, 1899.
W. HINDLEY & J. W. HARDING.
KNOTTER.
(Application filed Nov. 12, 1897.)
(No Model.) 6 Sheets—Sheet 4.

WITNESSES:
JAE Criswell.
HE Heuser.

INVENTORS:
William Hindley and
Joseph W. Harding
BY
W. B. Hutchinson,
ATTORNEY.

No. 638,243. Patented Dec. 5, 1899.
W. HINDLEY & J. W. HARDING.
KNOTTER.
(Application filed Nov. 12, 1897.)
(No Model.) 6 Sheets—Sheet 5.

WITNESSES:
J. E. Caswell.
H. E. Hensen.

INVENTORS:
William Hindley and
Joseph W. Harding
BY
W. B. Hutchinson
ATTORNEY.

UNITED STATES PATENT OFFICE.

WILLIAM HINDLEY, OF HOBOKEN, NEW JERSEY, AND JOSEPH W. HARDING, OF NEW YORK, N. Y., ASSIGNORS, BY MESNE ASSIGNMENTS, TO THE DIAMOND WOOD COMPANY, OF NEW JERSEY.

KNOTTER.

SPECIFICATION forming part of Letters Patent No. 638,243, dated December 5, 1899.

Application filed November 12, 1897. Serial No. 658,255. (No model.)

*To all whom it may concern:*

Be it known that we, WILLIAM HINDLEY, of Hoboken, in the county of Hudson and State of New Jersey, and JOSEPH W. HARDING, of New York, (Brooklyn,) in the county of Kings and State of New York, have invented certain new and useful Improvements in Knotters, of which the following is a full, clear, and exact description.

This invention relates to knotting devices, but more particularly to a device for tying knots in the binding material of wood-bundling machines.

The primary object of the invention is to provide an efficient device for securing the cord or binding material which may be employed in wood-bundling machines so as to effectually prevent its slipping or disconnection under great pressure, such as that secured by a square or reef knot, and which will secure or tie the knot in the binding cord or twine close to a hard and practically-unyielding substance or material.

A further object is to provide a simple and compact knotting device which may be used for various purposes, which may be connected so as to operate simultaneously with a series of devices of like character to tie a series or number of knots in unison, and which will readily tie and secure the coarse binding cord or twine usually employed for bundling wood and other materials.

With these and other objects in view the invention consists in the construction and combination of the several parts, substantially as hereinafter described and then pointed out in the claims at the end of the description.

Referring to the accompanying drawings, forming a part of this specification.

Figures 11, 12, 13, 14, 15, 16, 17, 18:
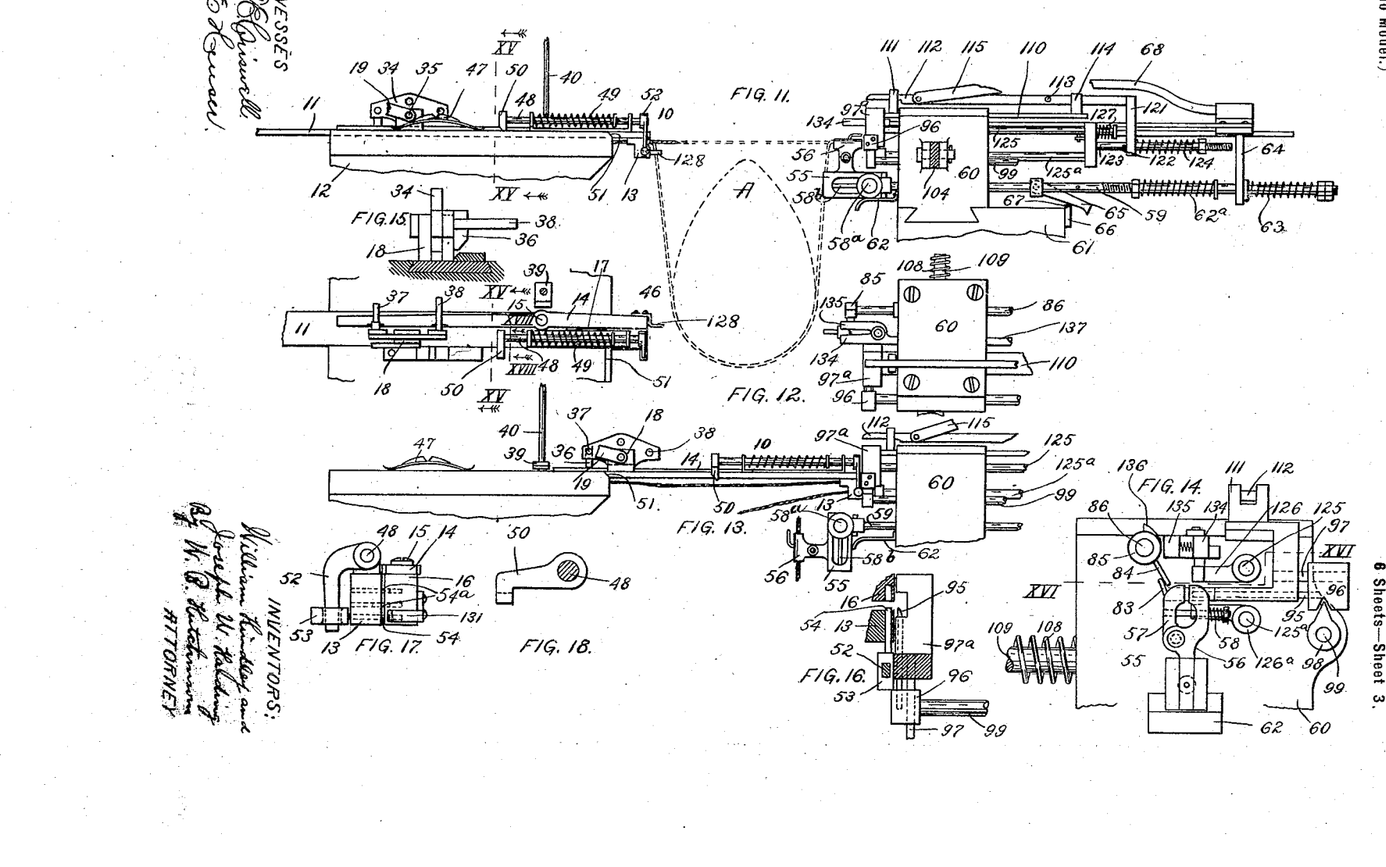
Fig. 11 is a side elevation, partly in section and partly broken away, of the lower portion of the knotting device, illustrating the position of the cord immediately after the knot is formed and the separation has taken place and in dotted lines the first and second positions of the cord, with the bundle in position to have the knot tied.
Fig. 12 is a fragmentary plan view of the device as shown in Fig. 11.
Fig. 13 is a side elevation, partly broken away, of the parts in position for the needle to pierce the bend of the loop.
Fig. 14 is a front elevation, on an enlarged scale, of the head, together with the movable parts thereon.
Fig. 15 is a vertical sectional view taken on the line XV XV of Fig. 11, showing the slide and the rocking block or plate for operating the movable jaws of the cord-carrier.
Fig. 16 is a sectional plan view on the line XVI XVI of Fig. 14, showing the needle for piercing and holding the bend of the loop.
Fig. 17 is a detail elevation of the inner or rear end view of the cord-carrier.
Fig. 18 is a transverse sectional view on the line XVIII XVIII of Fig. 12.

The knotting mechanism as illustrated in Figs. 1 to 24, inclusive, has a cord or binding material carrier 10, which is provided with a slide 11, the latter being arranged in a support 12 and carrying at one end thereof a clamping-jaw, as at 13, and has a bar or rod 14 pivoted thereto, as at 15, which is provided with a clamping-jaw 16, between which and the jaw 13 the twine or cord is adapted to be clamped and fed forward from the roll (not shown) or other source of supply, said jaws being normally pressed apart by means of a spring, as at 17 in Fig. 12. On the slide 11 may be arranged a bracket 18, which is connected by means of a rod or link 19 to the lower end of the arm or lever 20, which latter is arranged to swing or oscillate on the transverse shaft 21. The lever 20 may be provided with the cam projection 22, Fig. 1, which is adapted to be engaged at the proper time by the cams 23 and 24, arranged upon the disk 25, which latter is secured to the transverse shaft 26, the cams being adapted to engage the cam projection 22 and advance or force the cord-carrier and the clamping or carrying jaws 13 and 16, forming a part thereof, inwardly, for the purpose to be hereinafter explained. The cord-carrier 10 is retired or brought back to different positions by means of the cam projections 27, 28, and 29 on the disk 30, which projections engage a sliding block 31, as at 32, the said sliding block being slotted at both ends, so as to span the transverse shafts 26 and 21, and being provided with an elongated aperture, in which is a pin 33, projecting outwardly from the lever or arm 20, so that when the disk 30 rotates the cam projections thereon, engaging the sliding block 31, will throw the lower end of the arm or lever 20 rearwardly or outwardly and through the pitman or connecting-rod 19 retire the slide 11 and the clamping-jaws carried thereby.

Figures 1, 5, 6, 7, 8, 9, 10:
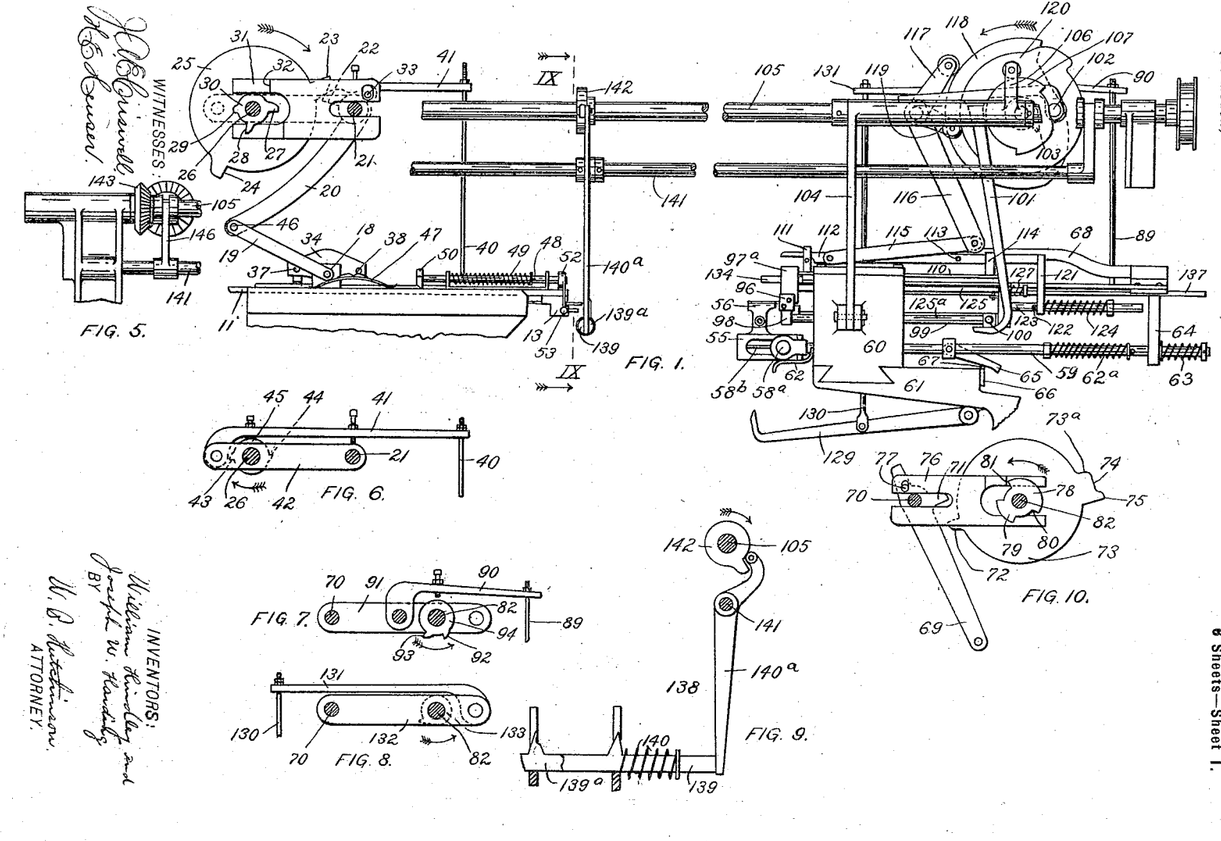
Figure 1 is a side elevation, partly in section and partly broken away, of one form of device embodying our invention.
Fig. 5 is a fragmentary detail elevation of one end of the driving mechanism for operating the knotter.
Fig. 6 is a fragmentary vertical sectional view, taken on the line VI VI of Fig. 2, of the mechanism for operating the movable clamping-jaw of the cord-carrier.
Fig. 7 is a detail vertical sectional view taken on the line VII VII of Fig. 2, illustrating a portion of the mechanism for operating the movable jaws of the nipper and the gripper.
Fig. 8 is a vertical sectional view, taken on the line VIII VIII of Fig. 2, of a portion of the mechanism for throwing the gripper in a vertical direction after being lowered.
Fig. 9 is a vertical transverse section, taken on the line IX IX of Figs. 1 and 2, of a portion of the cord cutting or separating mechanism.
Fig. 10 is a vertical sectional view taken on the line X X of Fig. 2, illustrating a portion of the mechanism for lowering and raising the gripper and for moving the nipper longitudinally of the device.
Figure 2:
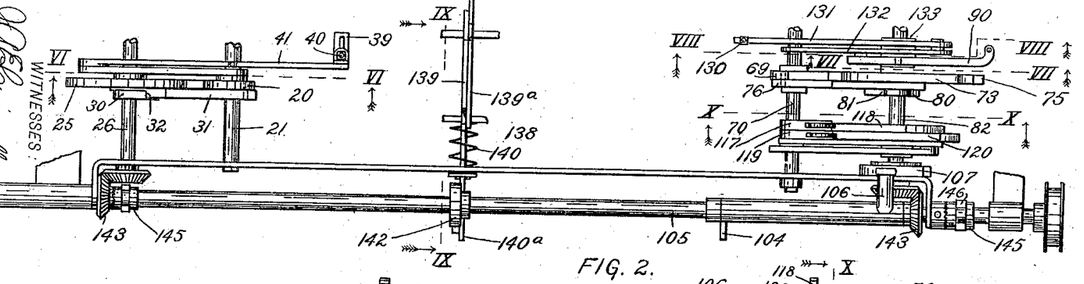
Fig. 2 is a plan view, partly broken away, of the upper portion of the driving mechanism of the knotter.
Figure 3:
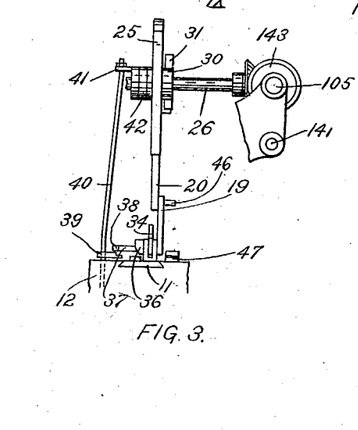
Figs. 3 and 4 are front and rear end views, respectively, of a portion of the device.

In order to cause the clamping-jaws 16 and 13 of the carrier 10 to positively engage the cord or twine or be released therefrom, we may pivot a rocking block or arm 34, as at 35, to the bracket 18. On one end of this rocking arm may be arranged a wedge-shaped cam 36, which is adapted to engage the inner edge of the bar 14, carrying the jaw 16, so as to throw the same inwardly on its pivot, while the reverse or open position is obtained through the pressure of the spring 17. At or near each end of the rocking arm 34 may be arranged rods or studs 37 and 38, which are adapted to move in the path of the collar or bracket 39, Fig. 12, secured at or near the lower end of the pendent rod 40, the said rod being secured to a bar 41, which may be pivoted at its outer or forward end to a suitable support 42, and which is adapted to be engaged by the cam projections 43 and 44 on the disk 45, which latter is secured on the transverse shaft 26, as shown in Fig. 6, in order that when the slide 11, together with the rocking arm or block 34, is advanced, so that the stud 38 is in the path of vertical movement of the bracket 39, the cam projection 43, acting on the rod 41, will raise the bracket and tilt the rocking block, so as to tilt the bar 41 on its pivot and cause the jaw 16 to grasp the cord and carry or advance the same forward at the proper time. On further advancing the carrier 10 the bracket 39, through the cam projection 44 and the arm 41, engages the stud or projection 37 on the rocking arm 34 and tilts the same to a medium position or away from the arm or bar 14, carrying the jaw 16, so that the clamping-jaws may be released from the cord or string and permit the cord to slip past the jaws when the latter are forced rearwardly or outwardly. A pin 46 projects outwardly from the pitman 19 and is adapted to engage a recess in the spring-block 47, in order to yieldingly retain the carrier in its proper position while the loop is being formed, as will be hereinafter described.

The slide 11 of the carrier 10 has a rod 48 journaled thereon, around which may be arranged a spring 49, adapted to retain said bar or rod normally against rotation. On one end of the rod 48 is arranged an arm 50, which is adapted to engage the beveled end 51 of the support 12 and lift the outer end of said arm, when the carrier is forced rearward, so as to rotate the rod 48 and throw the lower end of the arm 52, arranged on the opposite end of the bar 48, laterally. The arm 52 engages a block 53, which carries a pin 54, which is adapted to be thrown beneath the lower side of the loop at the proper time to retain and hold the same while the loop is being folded, a couple of rollers, as at 54$^a$, Fig. 17, being arranged in the jaw 13 of the carrier 10, between which the cord from the source of supply is adapted to pass.

The string or cord carried by the clamping-jaws 13 and 16 of the carrier 10 when moved forward is engaged by the jaws of the gripper 55. This gripper comprises two members, as 56 and 57, which are yieldingly held together by means of a spring, as at 58, and has a portion of the members thereof provided with a pin or rod 58$^b$, which passes through a short shaft 58$^a$, journaled in the end of a movable rod 59, by which means said gripper will rotate with the shaft 58ª when the rod 59 is moved forward or inwardly, or the gripper may have simply a vertical movement by means of the slotted base and the pin 58ᵇ, passing through an aperture in the shaft 58ª, a guide 62 being provided to support the base or lower portion of the gripper when in the position shown in Fig. 11. The rod 59 is longitudinally movable in the head 60, which latter is supported so as to have a transverse or lateral movement in the frame 61, and said rod has upon its outer or rear end springs 62ª and 63, arranged on opposite sides of a pendent bracket 64, so that when the latter is given a longitudinal movement the rod 59 and the gripper 55 will be forced forward or outwardly with a yielding pressure, according to the direction in which the bracket 64 is moved. The rod 59 is provided with a pawl or detent 65, having one end thereof adapted to pass over the plate 66 on the frame 61, so as to retain the rod and gripper in a forward position, a notch 67 being provided in the plate 66 to permit the rod 59 to be forced rearwardly when the pawl is in alinement therewith. The bracket 64 connects with an arm or bar 68, which has its inner end connected to a lever 69, pivoted so as to oscillate on the transverse shaft 70, as best shown in Fig. 10. The upper end of the lever 69 is provided with a projection 71, adapted to be engaged by the cam 72, arranged upon a disk 73, the latter being also provided with a cam 73ª, a raised portion 74, and a projecting cam 75, adapted to engage the projection 71 on the lever 69 to operate the same, so as to throw the lower end thereof forward to various positions, as will hereinafter appear. A sliding block 76 has a pin-and-slot connection 77 with the lever 69 and is adapted to be engaged by the cams 78 and 79 on the disk 80, as at 81, in order to force the lower end of the lever 69 rearward or outwardly. The yielding member 57 of the gripper 55 has a projection 83, Fig. 14, thereon adapted to be engaged by a pin or lug on the disk 85, which is secured to a rocking shaft 86. This rocking shaft extends longitudinally of the machine, and at or near the rear end thereof is provided with a finger 87, adapted to be engaged by a bracket or trip 88, Fig. 4, secured to the lower end of a rod 89, the latter being secured at its upper end to one end of an arm 90, which is pivoted so as to have vertical movement on the support 91, spanning the transverse shafts 70 and 82, as shown in Fig. 7. This arm 90 is arranged in the path of movement of the cams 92 and 93 of the disk 94, so that as the latter rotates with the shaft 82 the cams will engage an adjustable bolt or other portion of the arm 90 and raise the latter, so as to rock the shaft 86 in its bearings.

For the purpose of positively engaging the end of the loop centrally thereof, so as to rigidly hold the same while being folded, we may provide a needle 95, secured at one end to a block 96, which is guided on a rod or pin 97, projecting outwardly from a support 97ª. The block 96 may have a recess in the lower portion thereof, which is engaged by the end of the cam 98, Fig. 14, secured to the shaft 99, so that as the latter is rocked in its bearings the needle 95 will be forced inwardly to engage the cord, while a reverse movement or releasing of the needle from the cord or bend of the loop is secured by the inner face of the block 96, engaging the block 53, located on the cord-carrier 10, as shown in Fig. 16. The shaft 99 is journaled in the head 60 and has a lug 100, Figs. 1 and 4, projecting outwardly from or near the outer end thereof, which is adapted to be engaged at a predetermined time by means of the lower end of a vertically-movable lever 101. This lever may be substantially T-shaped and pivoted at one end, as at 102, to a suitable support and is adapted to be engaged by the cam 103, (shown in dotted lines in Fig. 1,) so that as said cam rotates the lever 101 will be raised and through it and the lug or projection on the shaft 99 will force the needle inward, so as to pierce a portion of the cord centrally of the loop.

Figure 4:
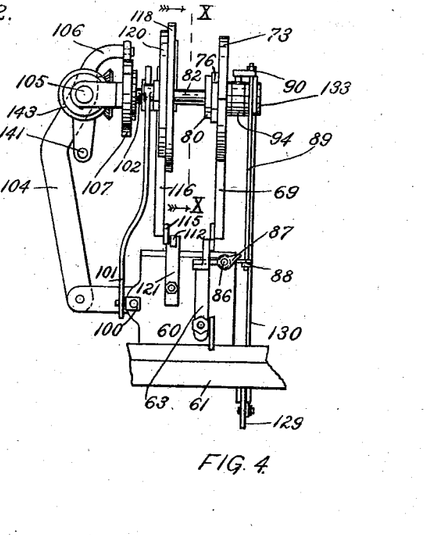

The head 60 is adapted to have a lateral movement in the support 61, and for this purpose the lower end of the lever 104, Figs. 1 and 4, is pivoted to lugs projecting outwardly from the head, while the upper end of the lever 104 is adapted to rock or oscillate on the shaft 105 of the driving mechanism. The upper end of the lever 104, as at 106, may be provided with a roller which is arranged in the path of movement of the cam 107, so that as the latter rotates the arm 104 will be rocked on the shaft 105 and cause the head to move across or transversely of the machine, the reverse movement of the head being secured by means of a spring 108, arranged around a shaft or rod 109 and abutting against one side of the head and a suitable stop on said rod, though the lateral shifting of the head in both directions may be secured in any desired manner.

The block or support 97ª, in which the needle 95 is arranged, may be secured to a slide 110, arranged to move back and forth in the head 60. This slide may be provided with a projection 111, which may have its upper end slotted and adapted to be engaged by the end of a bar 112, this bar being provided with a pin 113, adapted to engage a projection 114 on the slide 110, so that at the proper time the said slide may be moved either back or forth, according to the direction of movement of the bar 112. The bar 112 has a link 115 connected thereto at one end thereof, while its other end is connected to a rocking lever 116, Fig. 1, arranged upon the transverse shaft 70 of the driving mechanism. The upper end of the rocking lever 116 has a projection 117, adapted to be engaged by a cam 118, so as to force the link 115 and bar 112 rearward, and has a projection 119, adapted to be engaged by a cam 120, for forcing said parts in a reverse direction.

Figure 23:
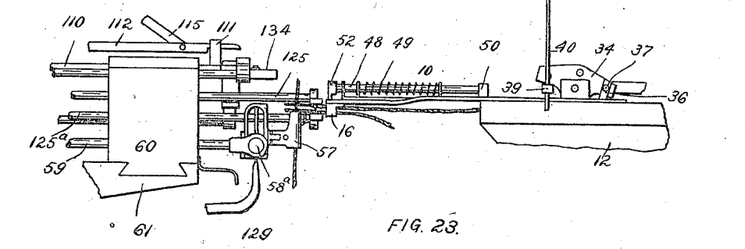
Fig. 23 is a side elevation looking at the same side as that shown in Fig. 22, the gripper having been moved in a vertical direction.
Figure 24:
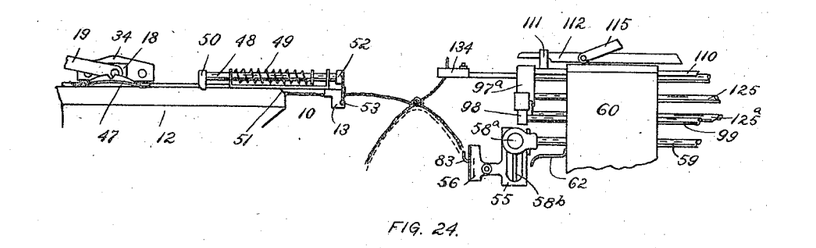
Fig. 24 is a side elevation, partly broken away on the opposite side to that shown in Fig. 23, showing the knot as it is being completed.
Figures 26, 28:
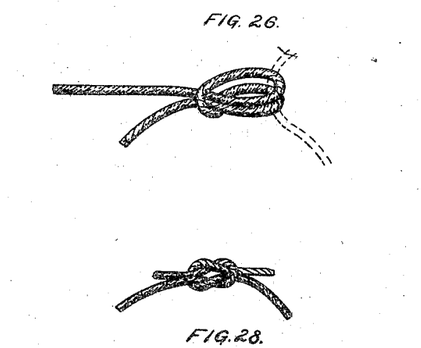

To fold or double the loop upon itself, as shown in Fig. 26, we may arrange the bracket 121 so as to move with the bar 112. This bracket is adapted to engage a pin 122 on the rod 123 when moving in one direction, while a yielding connection or spring 124 is arranged between the same and the rod 123 to permit the bracket to move a certain distance without operating said rod. The rod 123 may be connected by a yoke to the rods 125 and 125$^a$, which are adapted to move longitudinally in the head 60 and have at the outer ends thereof fingers 126 and 126$^a$, respectively. The upper folding finger and rod 125 may be yieldingly supported in the head 60 and is normally retained in a raised position by means of a spring 127, arranged between the connecting-yoke and the outer or rear end of the rod 125, a stop or bracket 128, Figs. 11 and 12, being arranged on the jaw 16 of the cord-carrier in order to prevent the loop from being forced laterally or to one side of a central position while being doubled over upon itself by the folding-fingers. The gripper 55 when the loop has been doubled over upon itself is then forced upwardly, so as to pass the free end carried thereby through the folded portions. To secure this result, a lever 129, Fig. 1, has one end thereof extending upwardly and its other end pivoted to the support 61 and intermediate of said ends is connected to the lower end of a vertically-moving connecting-rod 130. This rod is secured at its upper end to a vertically-moving arm 131, which may be pivoted to a support 132, arranged to span the transverse shafts 70 and 82, and has a portion thereof arranged in the path of movement of the cam 133, Fig. 8, so that as the latter rotates the arm 131 will be raised, and through it and the rod 130 the outer end of the arm 129 will engage the under surface of the base of the gripper 55 when in the position shown in Fig. 13 and will force the same upwardly, thus causing the free end of the cord held thereby to be passed through the folded loop, as shown in Fig. 23. The end of the cord at this time is engaged by a nipper 134. This nipper comprises two members pivotally held together, one of which, as 135, is yieldingly forced outwardly by means of a spring or otherwise and is adapted to be engaged by means of a cam 136, Fig. 14, on the disk 85 in order to tilt the member 135 on its pivot and grasp and rigidly hold the free end of the cord at the proper time. The nipper has one of its members secured to or formed integrally with the slide 137, which is adapted to move back and forth in the head 60 and has a portion thereof secured to the rocking shaft 86, so that the disk 85 may move longitudinally of the device with the nipper.

In order to separate the cord after the knot has been formed, we may use any suitable cutting mechanism, and, as shown, the mechanism 138 has two transversely-moving bars 139 and 139$^a$, each suitably supported in portions of the machine and provided with teeth, between which the cord is adapted to pass, so that when either or both rods move the cord will be cut with a shearing action, one of the bars having the teeth thereof provided with a recess or groove to form a seat for the cord, if desired. One of the bars, as 139$^a$, may have at one end thereof a spring 140, normally forcing the rod in one direction, while said rod is forced in an opposite direction by means of a lever 140$^a$, Fig. 9, which is arranged to oscillate or rock on the shaft or rod 141. This lever 140$^a$ has its upper end arranged in the path of movement of the cam 142, so that as the latter rotates the said arm will be rocked on its pivot and force the rod 139 transversely of the machine, so as to cut the cord.

The transverse shafts 26 and 82 may be operated in any desired manner, and, as shown, the shaft 105 may be provided with gears 143, which are in mesh with like gears upon the ends of the shafts. The gears 143 may have a friction or positive clutch, as shown, upon one of their faces, which are adapted to be engaged by clutch-collars 145, having grooves adapted to be engaged by the forked ends of the arms 146, the latter being secured to the rod 141, so that when the latter is shifted, so as to disengage the clutches, the shaft 105 may revolve without operating the driving mechanism of the knotter, or when the clutch-collars engage the clutch-faces of the gears the said mechanism will rotate in unison with the main driving-shaft, the rod 141 being usually connected with some portion of the bundling or other machine, so as to be automatically operated at the proper time.

The construction and operation of the invention will be readily understood from the foregoing description when taken in connection with the accompanying drawings.

Figures 19, 20:
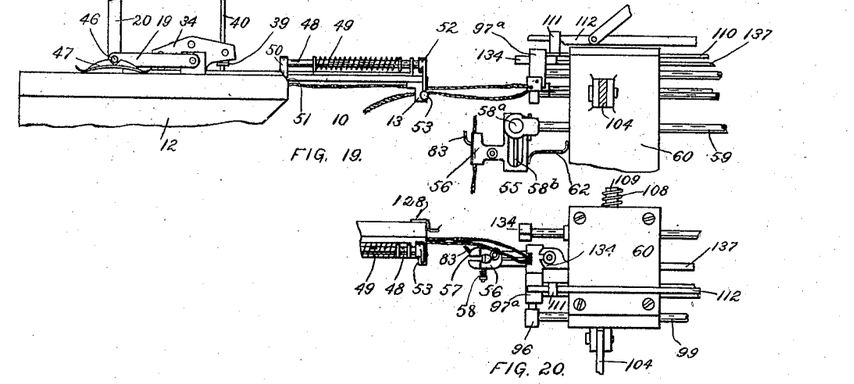
Fig. 19 is a side elevation, partly in section and partly broken away, illustrating the position of the parts after the loop has been formed.
Fig. 20 is a plan view, partly broken away, with the head and mechanism carried thereby shifted laterally prior to folding the loop.
Figure 21:
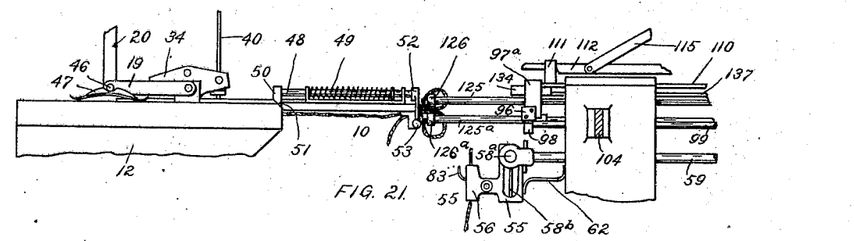
Fig. 21 is a side elevation, partly in section and partly in elevation, with the loop folded and ready for being doubled over upon itself.
Figure 22:
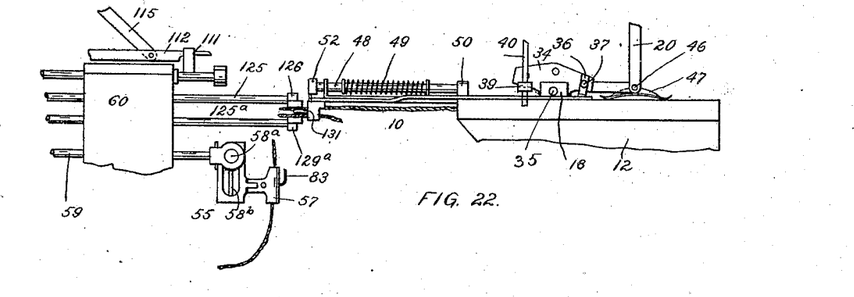
Fig. 22 is a side elevation looking from the opposite side to that shown in Fig. 21, illustrating the parts in the position they assume when the loop is doubled over.

Assuming the parts to be in the position shown in Fig. 11 and the cord-carrier 10 moved forward, so as to pass or cause the cord to be engaged by the gripper 55, and the carrier retired, so that the cord extends in a horizontal line, as shown by dotted lines in said figure, it will be seen that the wood, if such is to be bound, may fall between the head and the cord-carrier into suitable compressing arms or jaws, so as to carry the cord downward, at which time the wood or other material may be compressed to the form shown in dotted lines at A in the figure referred to. The transverse driving-shaft of the knotter being rotated, as hereinbefore explained, the gripper 55 will be forced downward to the position shown in Fig. 13 by the rod 59, bracket 64, bar 68, pivoted lever or arm 69, projection 71, and the cam 72 upon the disk 73, which is secured to the transverse shaft 82. The cord-carrier 10 now moves forward by means of the link 19 and pivoted lever 20, which latter is operated by the cam projection 23 on the disk 25 engaging the projection on the lever 20. The needle 95 is then operated by the cam 98, the rocking shaft 99, and the pivoted lever 101, so as to throw the needle inward or across the face of the head 60 to pierce the bend of the loop centrally thereof in order to rigidly hold the same and prevent its removal when the cord-carrier is retired. Simultaneously with the operation of the needle piercing the end of the loop the lower rod or pin 54 on the cord-carrier is thrown below the thread or cord by the spring 49 and the rod 48 throwing the arm 52 toward the jaw 13 of the carrier, so as to hold or support the lower side of the loop, the bar or pin remaining in this position until the carrier is retired to complete tying the knot. The cord-carrier 10 now retires to get the required length of loop which may be at one side of the vertical center of the bundle, the latter being shown in dotted lines at A, Fig. 11, in which position the carrier is yieldingly held by the pin 46 engaging the spring-block 47 while the knot is being formed and prior to the final tightening of the cord to complete the knot. Immediately that the cord-carrier arrives at the position just stated the gripping-jaw 16 of the carrier is operated so as to grasp both sides of the loop and hold the upper side of the loop rigidly, while the lower one is held sufficiently tight to be suspended or supported thereby to prevent its slipping as the folding operation is taking place; but as the knot is tightened at the final movement by the retirement of the cord-carrier and the nipper the lower side of the loop will be disengaged from the jaws of the carrier. The gripping-jaw 16 of the carrier is operated by the wedge 36 on the rocking block 34, the pin 38, carried by the rocking block, which is now in the path of vertical movement of the bracket 39, Fig. 19, the bracket 39 being operated by the rod 40, the arm 41, and the cam 43, so as to tilt the rocking arm or block 34 on its pivot. At this time the cam 107 on the transverse shaft 82 is in such a position that the head 60 will be forced laterally by means of the spring 108 to one side of the longitudinal center of the device, as shown in Fig. 20. The needle-bar, which now carries the end of the loop, and the folding-fingers are then forced inwardly by the bar 112 engaging the projection 111 on the slide 110, the bar 112 being connected by the link 115 to the pivoted lever 116, which is operated by the cam 120 engaging the upper portion 119 of said pivoted lever. During this forward movement of the needle and fingers the loop will be doubled or folded in the form shown in Fig. 21 and in enlarged detail in Fig. 25, and when they reach their extreme forward movement the head 60 will move laterally or transversely of the machine toward the cord-carrier, by which movement the needle 95 will be released or withdrawn from the end of the loop by the inner face of the block 96 engaging with the outer surface of the post 53, arranged on the cord-carrier 10. The bar 112 is now moved rearwardly or outwardly until the pin 113 engages the projection 114 on the slide 110, which will force the latter outwardly, so as to carry the support 97ª and the needle arranged therein to the position shown in Fig. 21. The folding-fingers 126 and 126ª during the retiring or rearward movement of the needle remain at the extreme outer throw thereof and are traveling laterally or transversely with the head toward the cord-carrier, so as to engage the folded loop and double the same upon itself, as shown in Fig. 22 and in detail in Fig. 26. As soon as the loop is doubled the gripper 55 is forced upwardly by means of the arm 129 through the connecting-bar 130, pivotal arm 131, and cam 133 on the transverse shaft 82, so that the free end of the cord carried by the gripper will be inserted through the folded and double loop, as shown in full lines in Fig. 23 and in dotted lines in detail in Fig. 26. The nipper 134, through the slide 137, rod or bar 68, pivotal lever 69, and cam 73ª on the disk 73, is advanced forward to the position to grasp the free end of the cord carried by the gripper, at which time the rocking-shaft 86 is operated through the finger 87 and trip 88, carried by the connecting rod or bar 89, so as to rock the said shaft in its bearings and through the cam 136 throw the pivotal member 135 inwardly on a pivot to grasp the end of the cord. This movement removes the cord from the jaws of the gripper, which latter now drops downwardly to the position shown in Fig. 22. The nipper by means of the cam 75 on the disk 73 operates the lever 69 and through the bar 68 advances the nipper to approximately the center of the bundle to centralize or position the knot. Simultaneously with the inward movement of the nipper to place the knot in the center of the bundle the carrier is being retired through the cam 28 on the disk 30 engaging the sliding block 31, which latter is connected to the pivotal lever 20 and through the link 19 connects with the slide 11 of the cord-carrier. As the cord-carrier is retiring the retaining-bar 54 is withdrawn by the arm 52 through the finger 50 riding upon the beveled surface 51, thus liberating the lower side of the loop. The nipper 134 is now moved toward the head by the cam 79 on the disk 80 engaging the sliding block 76, which latter connects with the pivotal lever 69 and through the bar 68 actuates the slide 137. The cord-carrier, also retiring simultaneously with the nipper, causes the bend of the loop to move inwardly across and upon the end of the cord engaged by the nipper, so as to interlock, as in Fig. 7. A further movement of the nipper and carrier completes the tightening of the knot, as in Fig. 28. The lateral movement of the head 60 toward the cord-carrier to double over or fold the loop upon itself places the detent or pawl 65 in alinement with the slot 67 of the plate 66, and as the nipper 134 retires, to complete the knot the bracket 64 engages with the spring 63 on the rod 59 and through it forces the rod 59 rearwardly and causes the gripper 55 to ride upon the slide or guide 62, so as to be restored to its normal position or that shown in Figs. 1 and 11. The cord between the knot and the cord-carrier may now be separated by the cutting device 138, as already described, at which time the bundle may be removed in any desired manner and the cord-carrier again forced forward by the driving mechanism, so as to cause the end of the same to be engaged by the jaws of the gripper 55 when the cord-carrier is again retired, thus placing the cord in a horizontal plane, as shown in Fig. 11, to receive and be carried downwardly by another bundle of wood or other material when dropped upon the same or into suitable compressing-arms, as already described.

We thus provide a simple and compact knotting device which will secure or tie the knot with binding cord or twine close to a hard and practically unyielding substance or material and of such a nature as to prevent its slipping or disconnecting while under great pressure.

In actual practice it is our intention to provide a series of knotting devices when desired and connect the same so as to operate in unison in order that wood may be bound in lengths and then separated into the proper-sized bundles or packages, as described in another application filed by us for improvements in bundling-machines. Only a single device is shown and described herein, as this is deemed all that is necessary, and ordinarily where a series of knotters are employed the driving mechanism shown at the upper portion of the device may be located at either or both ends of the bundling-machine and provided with single connections with the various working parts in order to simplify and reduce the number of parts to as small a number as possible. It will of course be understood that the knotting device may be used singly or in connection with similarly-constructed or other devices, if found desirable.

Figure 29:
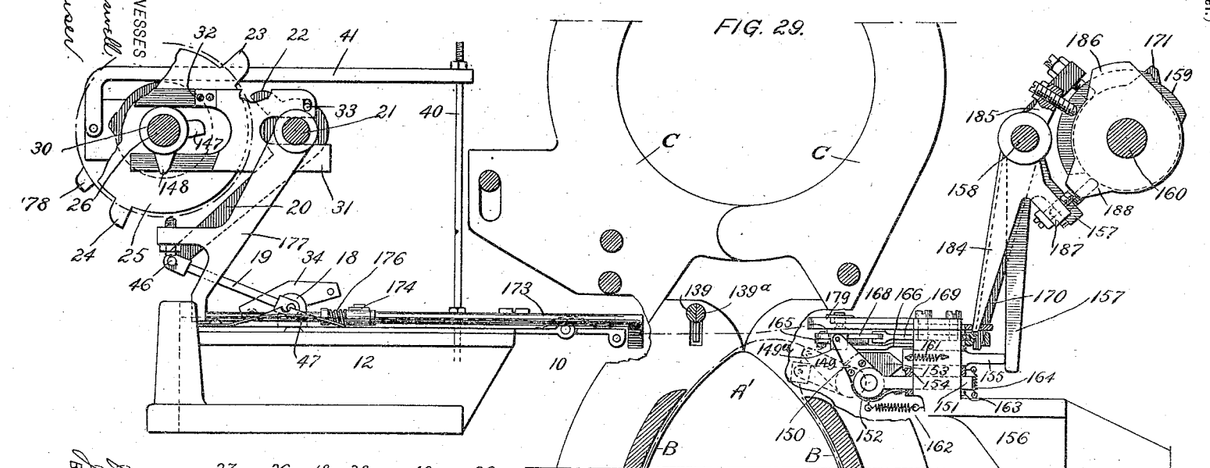
Figs. 29 and 30 illustrate a side elevation, partly in section and partly broken away, and a partial plan view, respectively, of another form of knotting device.
Figure 30:
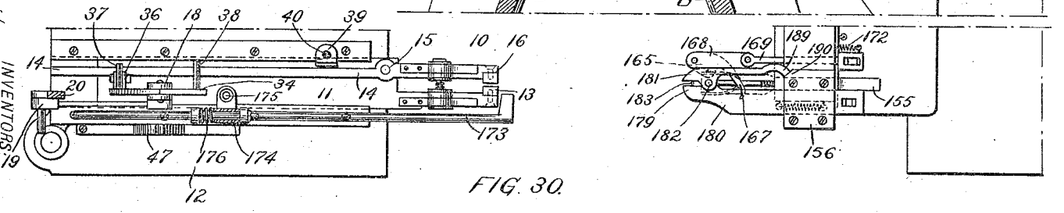

In Figs. 29 and 30 the cord-carrier is substantially the same both in operation and in construction to that described in the other form, except that the disk 30 on the shaft 26 is provided with two cam projections 147 and 148, respectively, instead of three, as previously described, so that one less movement of the sliding block 31 is secured, as will hereinafter appear. Here the string or cord carried by the clamping-jaws 13 and 16 of the carrier 10 when moved forward is received by the gripper 149, which comprises two spring-pressed gripping-jaws 149ª and an arm 150, pivoted to the inner end of the rod 151, and on which arm the gripping-jaws are arranged. The arm 150 is normally pressed upward by a spring, as 152, or otherwise, and on the arm 150 may be arranged a plate 153, having its forward edge beveled and adapted to engage the inner surface of a bar 154, said bar extending transversely of the machine and being adapted to operate the arm 150 of each knotter in unison. The bar 154 may be connected to a rod 155, which slides in the bracket or support 156 and has its outer end engaged by an arm or lever 157, which is pivoted so as to oscillate on the transverse shaft 158 and has a projecting end provided with a set-screw or other engaging portion adapted to be engaged by the cam 159, which is arranged on the transverse shaft 160 and is adapted to tilt the arm or lever 157 on its pivot and advance the bar 154 and through the plate 153 force the rod 151 and arm 150 forward and downward into the position shown in dotted lines in Fig. 29, the said bar 154 being returned to its normal position by means of a spring 161, having one end thereof secured to the bar and its other end secured to a bracket or support 156, the sliding rod 151 being returned by means of a spring, as at 162. The bar or plate 163 is arranged transversely of the support or bracket 156 and has its upper end fitting over the rod or bar 155 and has its lower end slotted so as to span the rod 151 of each knotter, the rod 155 being reduced in size so as to permit the bar 163 to be forced downward by the action of the spring 164 when the arm or lever 157 advances the rods 155 and 151 sufficiently to permit the said bar or plate 163 to slide over the latter rod, thus preventing the rod 151 from being forced rearwardly as the rod 155 and bar 154 are advanced, in order to cause the arm 150 to be rocked on its pivot and forced to the position shown in dotted lines, so as to carry the end of the string or cord below the path of movement of the clamping-jaws 13 and 16 of the carrier. The clamping-jaws are now advanced by means of the mechanism heretofore described to a point substantially midway over the opening A' and between the compressing-jaws B of the bundling-machine, so as to double or form the string in the shape of a loop, as shown diagrammatically by broken lines in Fig. 29, the clamping-jaws being frictionally held in this position by a pin or lug 46 on the pitman 19 engaging a recess in the upper surface of a spring-pressed stop or block 47, as hereinbefore described. At this time the loop is folded over in the form shown in Fig. 25. To secure this result, the arm 165 may be pivoted to the bracket 166, projecting outwardly from the support 156, and has its inner end 167 arranged in the path of the loop and its other or outer end pivoted to a link, as 168, this link being pivoted to the sliding rod 169, arranged in the bracket or support 156, and having its other end engaged by the lower end of the arm or lever 170, pivoted so as to oscillate on the transverse shaft 158, and provided at its upper end with an adjustable bolt or other engaging portion, which is adapted to be engaged by a cam 171, secured to the transverse shaft 160, so that the rods or cams will engage the bolt or projection on the lever 170 and carry the sliding rod 169 rearward and through the link 168 throw the end 167 on the arm 165 inward, so as to fold the loop upon itself, as in Fig. 25, a spring 172 being provided to return the arm to its normal position or that shown in Fig. 29.

Figure 27:
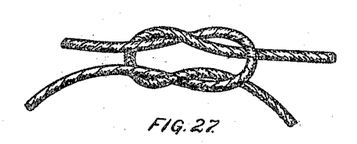

The upper and lower members of the loop may be doubled over by means of the inwardly-projecting forward end of the lever or arm 173, arranged upon the carrier 10. This arm may have a portion thereof arranged in a suitable bracket, as at 174, which may be pivoted to the slide 11, as at 175, and yieldingly connected to said bracket by means of a spring 176, arranged between the bracket and a suitable collar on said arm or lever. The outer end of the arm 173 is arranged in the path of movement of a rocking lever 177, which latter is arranged on the transverse shaft 21, and has a suitable projecting portion thereon adapted to be engaged by a cam 178, secured to the transverse shaft 26, so that as said cam rotates the lever will be rocked on its shaft and force the rod or arm 173 forward, so as to tilt the same or throw the forward edge thereof inwardly or across the face of the carrier and double the loop over to the position shown in detail in Fig. 26. At this time the sliding rods 155 and 151 are permitted to return to their normal position, and in doing so the end of the string or cord carried by the clamping-jaws 149ª of the gripper will be passed through the loop and engaged by the nipper 179. This nipper has one member 180 slidably held in the support or frame 156, at or near one end of which is pivoted a second or clamping member 181, as at 182, said members having their clamping ends or jaws normally pressed apart by means of the spring 183. The end of the member 180 is engaged by the lever 184, pivoted so as to oscillate on the transverse shaft 158 and provided with a projecting portion 185, adapted to be engaged by a cam 186 for forcing said member rearwardly, and with the projection 187, adapted to be engaged by a cam 188 for restoring said member to its normal position. The member 181 of the nipper 179 has one end thereof, as at 189, beveled or inclined and adapted to engage a beveled or inclined portion of the support 166, as at 190, so that immediately as the arm or lever 184 is forced so as to throw the member 180 outwardly or rearwardly the action of the beveled portion 190 upon the end 189 will close the member 181, so as to grip the string or twine, and by a further movement thereof the bend of the loop will move inwardly across the end of the string engaged by the nipper, so as to cause the two portions to slip and interlock, as in Fig. 27, and on further separation the nipper and cord-carrier will tie the knot, as shown in Fig. 28.

Figure 25:
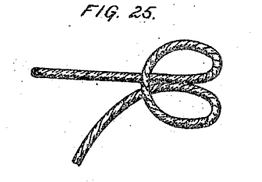
Figs. 25 to 28, inclusive, illustrate various stages of the knot while being formed.

In operation the wood, if such is to be bound, may be fed to the forming-arms C and from there drop into the compressing-arms B, both of which are adapted to open and close by suitable mechanism on the bundling-machine, (not shown,) the frame or support 156, as well as the frame or support 61 of the form shown in Figs. 1 to 24, inclusive, being adapted, when desired, to open and close simultaneously with the compressing-jaws B. The string or twine of each knotting device is carried forward by the carrier 10, so as to be engaged by the clamping jaws or block 149 of the gripper and rigidly held thereby, at which time the jaw 16 of the carrier is released from the twine by means of the bracket 39 engaging the pin 37 of the rocking arm or block 34, so as to tilt the same to a medium position, as hereinbefore described. The slide 11 now retires or is forced rearward by means of the cam 147 on the disk 30 engaging the sliding block 31, which through the pin 33 rocks the arm or lever 20 on the shaft 21. The jaws B then open by reason of suitable mechanism, thus opening the forming-arms C, so that the wood falls downward between the jaws, carrying with it the string or twine, the latter at this time being held at one end by the clamping-jaws 149ª of the gripper and being fed from the source of supply through or past the clamping-jaws 13 and 16 of the cord-carrier. The jaws B are now closed, so as to firmly compress the wood and to allow the forming-arms C to close by gravity ready to receive a new supply of wood. The rod 155 of the knotting mechanism is then forced inwardly by means of the arm or lever 157, so as to tilt the arm 150 on its pivot and force said arm and the rod 151 inwardly, so that the end of the string will project upwardly, as shown in dotted lines in Fig. 29. The rocking arm 34 is now operated, so as to cause the jaws of the carrier to rigidly grip the string or twine. The cord-carrier is then advanced or moved inwardly to substantially the central vertical plane of the compressing jaws or arms, during which movement, owing to the rigidity of the string or twine, a loop substantially of the form of that shown by short dotted lines in Fig. 29 will be formed, the position of the clamping-jaws being at this time about midway between the jaws B. The arm 165 is now operated by means of a lever or arm 170 through the link 168 and sliding rod 169, so as to throw the inner end 167 of said arm inwardly and fold the loop upon itself, as shown in Fig. 25. The folding-arm 173 is then operated, so as to double or fold the members of the loop, as shown in Fig. 26. At this time the rod 151 will return to its normal position, and in so doing the end of the string, which now extends upwardly, will be passed through the folded loop by the upward movement of the arm 150, as shown in dotted lines in Fig. 26, and will be engaged by the nipper 179, which at this time is being moved rearwardly by the lever 184 and the cam projection 186 on the shaft 160. As the nipper 179 moves rearwardly or outwardly, carrying with it the end of the twine, the carrier 10 will also be retired or forced outwardly by means of the cam 148 engaging the sliding block 30, so as to tilt the lever 20 on the shaft 21 and through the link or pitman 19 force the cord-carrier 10 in the same direction, thus rigidly securing the parts and forming the knot, as shown in Fig. 28. The string or twine may now be separated by mechanism substantially as that already described.

In using the term "cord" it is intended not only to include that commonly so called by such name, but also to include any material suitable for binding purposes and which may be secured or tied into a knot.

It is obvious that various changes in the arrangement and operation of the parts may be made, if desired, such as that the cord-carrier 10 may be made to have a lateral movement instead of the head 60 while the loop is being folded or that some of the parts which are shown as being operated by gravity may be positively operated, and that some of the parts or features of the invention may be differently constructed or other parts substituted therefor without departing from the spirit of our invention.

Having thus described our invention, we claim as new and desire to secure by Letters Patent—

1. A knotter, comprising a cord-carrier, means for receiving the cord from the carrier, means for operating the carrier to form a loop in the cord, and mechanism for folding the loop and completing the knot, substantially as described.

2. A device of the character described, comprising a cord-carrier, a gripper to receive the cord from the carrier, means for operating the carrier to form a loop in the cord, means for folding the loop, means for doubling the folded loop, and means for completing the knot, substantially as described.

3. A device of the character described, comprising a cord-carrier, a gripper to receive the cord from the carrier, means for operating the carrier to form a loop in the cord, a needle adapted to pierce the bend in the loop and fold the loop upon itself, means for doubling the folded loop, and means for completing the knot, substantially as described.

4. A device of the character described, comprising a gripper, means for carrying the cord to the gripper and for forming a loop in the cord, a needle to pierce the bend in the loop and to fold the loop, longitudinally-movable fingers to double the folded loop upon itself, and means for completing the knot, substantially as described.

5. A knotter, comprising a cord-carrier, a gripper to receive the cord from the carrier, means for operating the carrier to form a loop in the cord, a needle adapted to pierce the bend of the loop and fold the loop upon itself, fingers to double the folded loop, means for operating the gripper so as to pass one end of the cord through the folded and doubled loop, a nipper to receive the end of the cord from the gripper, and means for completing the knot, substantially as described.

6. A knotter, comprising a direct reciprocating cord-carrier, means for moving the carrier back and forth, and means for receiving the cord from the carrier and for folding and completing the knot, substantially as described.

7. A device of the kind described, comprising a cord-carrier, a gripper adapted to receive the cord from the carrier, means for operating the carrier so as to occupy different positions and to form a loop in the cord, means for folding the loop upon itself, a nipper adapted to receive the cord from the gripper, and means for operating the nipper and the gripper, substantially as described.

8. A device of the kind described, comprising a cord-carrier, means for operating the carrier so as to occupy different positions, a vertically and longitudinally moving gripper adapted to receive the cord from the carrier, means for folding the cord upon itself, a nipper adapted to receive the cord from the gripper, and means for operating the nipper and the gripper, substantially as described.

9. A knotting device, comprising a cord-carrier, means for operating the carrier, a gripper adapted to receive the cord from the carrier, fingers, and means for operating the same so as to fold the cord upon itself, a nipper adapted to receive the cord from the gripper, and means for operating the nipper and the gripper, substantially as described.

10. A device of the character described, comprising a cord-carrier, a gripper adapted to receive the cord from the carrier, means for operating the carrier so as to form a loop in the cord, a needle adapted to pierce and rigidly hold the loop of the cord, means for folding the loop upon itself, a nipper adapted to receive the cord from the gripper, and means for operating the several parts, substantially as described.

11. A device of the kind described, comprising a cord-carrier, means for operating the carrier, a gripper adapted to receive the cord from the carrier, a needle adapted to pierce and rigidly hold a portion of the cord, folding-fingers and means for operating the same so as to fold the cord upon itself, a nipper adapted to receive the cord from the gripper, and means for operating the nipper and the gripper, substantially as described.

12. A device of the kind described, comprising a cord-carrier, means for operating the carrier, a vertically and longitudinally movable gripper adapted to receive the cord from the carrier, a needle and means for operating the same so as to engage a portion of the cord and rigidly hold the same during the folding operation, laterally-movable folding-fingers and means for actuating the same so as to fold the cord upon itself, a nipper adapted to receive the cord from the gripper, and means for operating the nipper and gripper, substantially as described.

13. A knotting device, comprising a cord-carrier, means for operating the carrier so as to occupy different positions, a vertically and longitudinally movable gripper adapted to receive the cord from the carrier, fingers, and means for actuating the same so as to fold the cord upon itself, means adapted to receive the cord from the gripper, and means for operating the gripper, substantially as described.

14. A device of the kind described, comprising a cord-carrier, means for operating the carrier so as to occupy different horizontal positions, a gripper adapted to receive the cord from the carrier, a laterally-movable needle and means for operating the same so as to pierce and rigidly hold a portion of the cord while being folded, fingers and means for actuating the same so as to fold the cord upon itself, means adapted to receive the cord from the gripper, and means for operating the gripper, substantially as described.

15. A knotter, comprising a horizontally and vertically moving gripper, means for operating the gripper, means for carrying the cord to said gripper, and means for folding the cord upon itself and for completing the knot, substantially as described.

16. A device of the kind described, comprising a gripper, means for carrying the cord to the gripper, a needle and means for operating the same so as to pierce a portion of the cord and rigidly hold the same while being folded, means for folding the cord upon itself, and a nipper adapted to receive the cord from the gripper, substantially as described.

17. A device of the kind described, comprising a gripper, means for feeding the cord to the gripper, a laterally-movable head in which the needle and the gripper are mounted, fingers and means for operating the same so as to fold the cord upon itself, and means to receive the cord from the gripper to assist in completing the knot, substantially as described.

18. A device of the kind described, comprising a gripper, means for feeding the cord to said gripper, a needle adapted to pierce a portion of the cord and rigidly hold the same while being folded, fingers and means for operating the same for folding the cord upon itself, a nipper adapted to receive the cord from the gripper, and means for operating the nipper and the gripper, substantially as described.

19. A knotting device of the kind described, comprising a gripper, means for feeding the cord to the gripper, means for folding the cord upon itself, a nipper adapted to receive the cord from the gripper, and a laterally-movable head in which the nipper, gripper and folding-arms are mounted, substantially as described.

20. A device of the kind described, comprising a cord-carrier, means for operating the carrier, a gripper, a needle adapted to pierce a portion of the cord as to rigidly hold the same while being folded, means for shifting and carrying the needle and cord to one side of the longitudinal center, and means for folding and completing the knot, substantially as described.

21. A device of the kind described, comprising a cord-carrier, means for operating the carrier so as to occupy different positions, a vertically-moving gripping device adapted to receive the cord from the carrier, a needle and means for operating the same so as to pierce a portion of the cord and rigidly hold the same while being folded, fingers, and means for operating the fingers, so as to fold the cord upon itself, means for moving the fingers and needle laterally, and means for completing the knot, substantially as described.

22. A device of the kind described, comprising a cord-carrier, a longitudinally and vertically moving gripper adapted to receive the cord from the carrier, means for folding the loop and completing the knot, and means for separating or cutting the cord after the knot has been tied, substantially as described.

23. A device of the kind described, comprising a cord-carrier, a movable bar or pin arranged on the carrier so as to be thrown below the lower side of the loop or be removed therefrom at the proper time, a gripper adapted to receive the cord from the carrier, means for folding the loop upon itself, and means for completing the knot, substantially as described.

24. A device of the character described, comprising a cord-carrier, a pin arranged thereon, means for operating the pin so as to be forced below the lower side of the loop while being formed or be removed therefrom at the proper time, a gripper adapted to receive the cord from the carrier, a laterally-moving needle and means for operating the same so as to pierce a portion of the loop and rigidly hold the same centrally while being folded, means for folding the cord upon itself, and a nipper adapted to receive the cord from the gripper to complete the knot, substantially as described.

25. A knotting device, comprising a cord-carrier having a pin or bar arranged thereon, means for operating the bar or pin so as to throw the same beneath the lower side of the loop while being formed or to remove the pin therefrom, a vertically and longitudinally movable gripper adapted to receive the cord from the carrier, a needle adapted to pierce the end of the loop centrally thereof so as to rigidly hold the same while being folded, fingers adapted to fold the cord upon itself, a laterally-moving head in which the needle and folding-fingers are mounted, means for forcing the gripper upwardly so as to pass the free end of the cord through the folded loop, a nipper adapted to receive the free end of the cord from the gripper so as to form and complete the knot, and mechanism for operating the nipper, substantially as described.

26. In a device of the kind described, the combination with a movable cord-carrier, of a bar or pin movable thereon and adapted to be thrown beneath the lower side of the loop, and means for operating the pin, substantially as described.

27. In a device of the kind described, the combination with a cord-carrier, of a pin arranged thereon, an arm engaging a portion of the pin so as to move the same across the face of the carrier, a rod mounted upon the carrier adapted to rock the arm and move the pin, and means for operating the bar or rod, substantially as described.

28. In a device of the kind described, a cord-carrier, comprising a slide, a fixed jaw carried by the slide, and a bar or rod pivoted to the carrier and provided with a jaw at one end thereof between which and the jaw of the slide the cord is adapted to be clamped, substantially as described.

29. In a device of the kind described, the combination with a cord-carrier having a fixed jaw thereon, a pivoted bar on which a movable jaw is arranged, a rocking plate or block mounted upon the carrier and adapted to operate the bar on its pivot, and means for operating the rocking block or plate, substantially as described.

30. In a device of the kind described, a cord-carrier having a fixed jaw and a pivoted bar carrying a movable jaw, a pivoted rocking block adapted to operate the bar and movable jaw of the carrier, pins projecting outwardly from the rocking block, a vertically-movable rod having a portion thereof arranged in the path of movement of the rocking block, and means for operating the vertically-moving rod so as to engage either of the pins of the rocking block and tilt the latter on its pivot, substantially as described.

31. In a device of the kind described, the combination with a cord-carrier, of a link connected thereto, a lever and means for operating the lever so as to impart movement to the carrier, a pin projecting outwardly from the link, and a yielding detent or block adapted to be engaged by the pin so as to removably hold the carrier while the pin is engaged thereby, substantially as described.

32. In a device of the kind described, the combination with a cord-carrier, of a lever and means for connecting the lever to the carrier, a disk provided with a cam projection or projections for operating the carrier in one direction, a sliding block connected to the lever, and a disk provided with projections adapted to force the block and lever in an opposite direction, substantially as described.

33. In a device of the kind described, a gripper comprising two members between which the cord is adapted to be held, a longitudinally-movable bar or rod to which the gripper is rotatably and vertically movable, a detent or pawl adapted to engage a portion of the frame, means for releasing the pawl from the frame, together with means for operating the bar in either direction, substantially as described.

34. In a device of the kind described, the combination with a longitudinally-movable bar, a shaft or stud journaled on the bar, a gripper having a slotted base and means passing through the shaft or pin so as to rotate with the same or be moved vertically independently thereof, substantially as described.

35. In a device of the kind described, the combination with a longitudinally-movable bar or rod, of a gripper rotatably and vertically movable thereon, a pivotal lever having a portion thereof adapted to engage the gripper so as to force the same vertically, and means for operating the pivotal lever, substantially as described.

36. In a device of the kind described, the combination with a suitable support, of a needle arranged therein and adapted to engage a portion of the loop so as to rigidly hold the same, a cam projection adapted to engage a portion of the needle so as to force the same inwardly, a rocking shaft or rod to which the cam projection is secured, and means for operating the rocking shaft, substantially as described.

37. In a device of the kind described, the combination with a pair of longitudinally-movable fingers, means for operating the same so as to fold the cord upon itself when formed into a loop, a needle adapted to pierce the end of the loop when formed so as to rigidly hold the same, a laterally-movable head which carries the folding-fingers and the needle, and mechanism for moving the needle and folding-fingers independently of each other, substantially as described.

38. In a device of the kind described, the combination with a direct reciprocating nipper having a movable member, of a disk having a projection adapted to operate the movable member, a rod or shaft movable with the nipper to which the disk is secured, and means for rocking said shaft in its bearings, substantially as described.

39. In a device of the kind described, the combination with a suitable nipper, of a pivotal lever, means for connecting said lever to the nipper so as to move in unison therewith, a disk having cam projections thereon adapted to engage the lever so as to place the nipper in various positions, a sliding block connected to the lever, and a disk provided with projecting cams thereon adapted to engage the sliding block so as to operate the pivotal lever in a reverse direction, substantially as described.

WILLIAM HINDLEY.
JOSEPH W. HARDING.

Witnesses:
W. B. HUTCHINSON,
BERTHA DEYO.